United States Patent
Henderson

(10) Patent No.: US 11,561,098 B2
(45) Date of Patent: Jan. 24, 2023

(54) INERTIAL NAVIGATION SYSTEM

(71) Applicant: Atlantic Inertial Systems Limited, Plymouth (GB)

(72) Inventor: Geoffrey Thomas Henderson, Yelverton (GB)

(73) Assignee: ATLANTIC INERTIAL SYSTEMS, LIMITED, Plymouth (GB)

( * ) Notice: Subject to any disclaimer, the term of this patent is extended or adjusted under 35 U.S.C. 154(b) by 719 days.

(21) Appl. No.: 16/548,941

(22) Filed: Aug. 23, 2019

(65) Prior Publication Data

US 2020/0064136 A1    Feb. 27, 2020

(30) Foreign Application Priority Data

Aug. 24, 2018 (GB) ...................... 1813850

(51) Int. Cl.
| | | |
|---|---|---|
| *G01C 21/18* | (2006.01) | |
| *B64G 1/28* | (2006.01) | |
| *G01C 19/5719* | (2012.01) | |
| *G01C 21/16* | (2006.01) | |
| *G01C 25/00* | (2006.01) | |

(52) U.S. Cl.
CPC ............. *G01C 21/18* (2013.01); *B64G 1/28* (2013.01); *G01C 19/5719* (2013.01); *G01C 21/165* (2013.01); *G01C 25/005* (2013.01)

(58) Field of Classification Search
None
See application file for complete search history.

(56) References Cited

U.S. PATENT DOCUMENTS

| | | | |
|---|---|---|---|
| 5,194,872 A | | 3/1993 | Musoff et al. |
| 5,406,858 A | * | 4/1995 | Brainard .............. G01C 25/005 74/5.34 |

(Continued)

FOREIGN PATENT DOCUMENTS

GB    2039674 A    8/1980

OTHER PUBLICATIONS

European Search Report for Application No. 19193154.2, dated Feb. 3, 2020, 10 pages.

(Continued)

*Primary Examiner* — Paul M. West
*Assistant Examiner* — Mark A Shabman
(74) *Attorney, Agent, or Firm* — Cantor Colburn LLP

(57) ABSTRACT

An inertial navigation system includes a first inertial measurement unit with at least a first sensor and a second inertial measurement unit with at least a second sensor corresponding in type to the first sensor. The first inertial measurement unit is rotatably mounted relative to the second inertial measurement unit, The inertial navigation system further include a controller arranged to: acquire a first set of measurements simultaneously from both the first inertial measurement unit and the second inertial measurement unit; rotate the first inertial measurement unit relative to the second inertial measurement unit; acquire a second set of measurements simultaneously from both the first inertial measurement unit and the second inertial measurement unit; and calculate from the first set of measurements and the second set of measurements at least one error characteristic of the first sensor and/or the second sensor.

14 Claims, 1 Drawing Sheet

(56) References Cited

U.S. PATENT DOCUMENTS

| | | |
|---|---|---|
| 2006/0053887 A1 | 3/2006 | Fall |
| 2011/0313703 A1 | 12/2011 | Petillon et al. |
| 2013/0139566 A1* | 6/2013 | Jones .................. G01B 5/25 |
| | | 73/1.75 |
| 2016/0214742 A1 | 7/2016 | Carroll |
| 2016/0223357 A1* | 8/2016 | Frey, Jr. ............... G01C 25/005 |

OTHER PUBLICATIONS

Intellectual Property Office Search Report for International Application No. GB1813850.3 dated Feb. 20, 2019, 4 pages.

EPO Official Letter for Application No. 19193154.2, mailed May 25, 2022, 79 Pages.

GB Official Letter from IPO for Application No. 1813850.3, mailed Mar. 11, 2022, 4 pages.

Savage, Paul G: "Improved Strapdown Inertial System Calibration Procedures Part 1—Procedures and Accuracy Analysis", Oct. 20, 2017 (Oct. 20, 2017), pp. 1-70, XP055923527, Retreved from the Internet: URL:http://www.strapdownassociates.com/improved%20Rotation%20Test%20Part201.pdf [retrieved on May 20, 2022].

* cited by examiner

INERTIAL NAVIGATION SYSTEM

FOREIGN PRIORITY

This application claims priority to Great Britain Patent Application No. 1813850.3 filed Aug. 24, 2018, the entire contents of which is incorporated herein by reference.

TECHNICAL FIELD

This disclosure relates to inertial navigation systems, in particular those used for navigation on a moving platform such as an aircraft.

BACKGROUND

Navigation systems can use a variety of different sensors to detect changes to the motion and orientation of an object. For example accelerometers, gyroscopes and magnetometers are often used. Accelerometers detect applied force, gyroscopes detect rotation rates and magnetometers detect the Earth's magnetic field and so can be used to determine orientation.

Inertial navigation systems, based on accelerometers and gyroscopes, can be used either on their own or together with other navigation systems such as global positioning system (GPS).

An inertial navigation system typically comprises an inertial measurement unit (IMU) which has one or more sensors in the form of one or more linear accelerometers and/or one or more gyroscopes. The inertial navigation system then takes the outputs from the IMU, combines them with other information where available and outputs an overall navigation solution typically comprising position and/or attitude information, depending on the sensors present. A full three dimensional IMU normally has three orthogonal linear accelerometers and three orthogonal gyroscopes so that it can measure acceleration along three orthogonal axes and rotations around three orthogonal axes.

The sensors of an IMU each have errors associated with them resulting from variations in manufacturing processes as well as variations over time due to temperature changes, humidity changes, other mechanical stresses affecting the sensor, and/or material properties changing with time. In most sensors these errors are expressed as a bias and a scale factor. The bias is a systematic offset, while a scale factor is a multiplier that scales the sensor output linearly. Both of these error values can vary from one sensor to another and therefore each sensor is normally calibrated after manufacture so as to establish and store the particular errors associated with that sensor. Such calibration is normally done in a testing laboratory shortly after manufacture and the determined bias and scale factor are stored with (or on) the sensor device so that the errors can be compensated during use. However, the errors drift over time due to variations in temperature and material ageing. This can be a problem where a sensor is being used some time after calibration, or in environmental conditions that have changed significantly from its calibration setup. For example, a sensor may not be put into use for several months after its initial calibration, by which time that calibration will not be as accurate as it was. The bias and scale factor may be different each time the unit is switched on. In cases where the sensor accuracy is of high importance, the sensor can be recalibrated periodically to re-determine its errors, such as its bias and scale factor. Any uncorrected errors manifest as navigation errors during use.

Calibration is done in known conditions. In particular, for gyroscopes and accelerometers, calibration may be done by taking measurements with the sensors stationary and non-rotating. Any output from the sensor when it is known not to be moving must be due to sensor errors. For example, a bias in a linear accelerometer will manifest as an increasing velocity output which can be measured, thereby measuring the sensor bias. For more complicated error measurement, the sensor can be put through a sequence of movements that together test and measure the various errors that may be present. For example, in the case of a full 3D IMU with three accelerometers and three gyroscopes, there is a known sequence of manoeuvres known as the "Savage" sequence. Measurements are taken from the inertial measurement unit after each manoeuvre of the sequence and the resulting information can be combined together to determine the errors (biases and scale factors) in each individual sensor in the IMU. Such calibrations are typically carried out by mounting the sensor (or IMU) on a rotatable platform, which may be rotatable around more than one axis, e.g. it may be gimballed for rotation about at least two axes. Readings are taken when the IMU is at rest between movements and the sensors are re-oriented repeatedly until sufficient information has been obtained to calculate the errors.

Such calibrations cannot be performed while the IMU is moving, i.e. on a moving vehicle as they rely on the sensor being at rest during the measurement. Thus, in a typical setup, the sensors will only experience acceleration due to gravity and the various rotational forces that are applied as part of the measurement sequence. Some efforts can be made to monitor and adjust the sensor calibration during use, e.g. during a flight by using aiding data from other sensors, e.g. satellite positioning data and comparing that to the sensor outputs and thereby estimate the sensor errors. However, such aiding data is not always available or can be inaccurate. For example, GPS satellite accuracy can vary greatly, especially in highly featured terrain which blocks the view to satellites, or GPS can even be jammed or spoofed.

SUMMARY

According to this disclosure, there is provided an inertial navigation system comprising: a first inertial measurement unit comprising at least a first sensor; and a second inertial measurement unit comprising at least a second sensor corresponding in type to the first sensor; wherein the first inertial measurement unit is rotatably mounted relative to the second inertial measurement unit; and wherein the inertial navigation system further comprises a controller arranged to: acquire a first set of measurements simultaneously from both the first inertial measurement unit and the second inertial measurement unit; rotate the first inertial measurement unit relative to the second inertial measurement unit; acquire a second set of measurements simultaneously from both the first inertial measurement unit and the second inertial measurement unit; and calculate from the first set of measurements and the second set of measurements at least one error characteristic of the first sensor and/or the second sensor.

Using two separate IMUs with one rotatable relative to the other means that the two IMUs are mounted such that the orientation of some or all of the sensors in the first IMU can be changed with respect to their counterparts in the second IMU. With two separate IMUs, not only can the error characteristics of the sensors be determined, but this can be done at the same time as obtaining measurements of the continually changing main sensor output (e.g. measurements of acceleration and/or rotation). This allows the inertial measurement calibration to be performed while on the move rather than having to perform calibration while the IMU is at rest. This is a great advantage as it means that the IMU can be continuously calibrated throughout travel rather than only being calibrated occasionally while stationary. As sensor errors drift continuously, albeit slowly, over a long journey (e.g. a long flight of several hours), the sensor drift can mount up to a significant source of error, even if the IMU were to be calibrated while stationary between each journey. Calibrating on the move allows the sensor errors to be continuously determined and incorporated into the navigation calculations so that navigation throughout the journey is as accurate as possible.

While the addition of a second IMU to the inertial measurement system adds to the cost, the accuracy gained by being able to calibrate more regularly is justified, especially in high accuracy systems where heavy reliance may be placed on the inertial navigation solution with minimal or no reliance on external aiding data such as satellite navigation (which can be inaccurate, jammed or spoofed) or terrain/radar based navigation (which requires suitably featured terrain and emission of electromagnetic radiation).

Some systems have used a single rotatable IMU to perform calibration during use, i.e. during movement of the platform to which the IMU is mounted. However, such systems rely on relatively low dynamics such that the sensor inputs (accelerations and/or rotations) can be considered constant over the course of the IMU rotation/measurement. Such systems cannot be used in high dynamic platforms where a lot of movement can be expected, e.g. aircraft such as airplanes or helicopters. High dynamics means that the forces affecting the sensors can be expected to have changed between one measurement and the next. Without the second IMU of this disclosure, this would mean that it is impossible to separate the part of the signal relating to movement of the platform from the part of the signal relating to sensor error.

In a straightforward implementation, it may be sufficient to mount the first IMU so that it is only rotatable about a single axis. In the case of a single sensor IMU, e.g. with only a single accelerometer or only a single gyroscope, this would be sufficient to allow two measurements at different orientations so that the sensor bias could be determined and removed. However, where more sensors are present in the IMU or where it is desired to determine more than one error characteristic (e.g. a sensor bias and a sensor scale factor), greater flexibility may be required. Therefore in preferred examples the first IMU is rotatably mounted to rotate around at least two different axes. In preferred examples these axes will be orthogonal, but this need not necessarily be the case. Preferably the first IMU is mounted to rotate around three different axes. Again, preferably these are mutually orthogonal or at least arranged so as to define a three dimensional coordinate system.

As discussed, different sensor error characteristics can be determined by suitable choices of rotations and measurements of the two IMUs. However, in some preferred examples the controller is arranged to calculate the sensor bias of at least the first sensor and/or the second sensor. In other preferred examples (or in addition to the foregoing examples) the controller is arranged to calculate the sensor scale factor of at least the first sensor and/or the second sensor. The bias and scale factor errors are the most significant error characteristics of most IMU sensors such as accelerometers and gyroscopes and therefore determination of these gives the greatest increase to overall accuracy. In other examples, the controller may be arranged to calculate sensor misalignment angles, i.e. where the sensors are not perfectly aligned with the axes that they were intended to align with, these angular errors can also be estimated. In other examples, higher order sensor errors can be estimated, e.g. if bias is zero'th order and scale factor is first order, then a second order (quadratic) or even third order (cubic) sensor errors can be calculated.

As discussed above, in a particularly simple set up it may be sufficient to perform a single rotation about a single axis, e.g. to determine the bias error of a single accelerometer. However, in more complicated IMUs with multiple sensors aligned along multiple different axes, a more complex set of measurements will be required to obtain enough information from the system to fully determine all desired error characteristics. Different rotations around different axes, with measurements taken after each rotation, will allow different combinations of sensor orientations. Each different measurement then essentially provides an equation to an overall set of simultaneous equations that can be solved for the unknowns (being the desired parts of the signal and the error parts of the signal from each sensor). The equations can be solved in any suitable way by known algorithms, although in one particularly preferred arrangement a Kalman filter (or other least squares estimator) can be used to estimate a solution in an efficient manner.

The controller may be arranged to rotate the first IMU relative to the second IMU through a sequence of manoeuvres. This predetermined sequence can be selected so as to move the relative orientations of the first and second IMUs through all the desired arrangements in an efficient manner, with sensor measurements being taken between each manoeuvre of the sequence. The number of steps in the sequence (and therefore the number of relative orientations of the two IMUs) is determined by the number of unknown variables that need to be calculated as part of the whole error determination. For example it may be that not all error characteristics of all sensors need to be determined (e.g. if they are known to have negligible drift). However normally it will be desirable to determine all errors where possible. One particular sequence of rotations is known from standard calibration techniques that are used for calibrating a single IMU in a laboratory. This sequence is known as the "Savage" sequence after its originator. The Savage sequence is a sequence of typically in the region of up to 20 manoeuvres (depending on what is required) that efficiently allows enough measurements to determine the biases, scale factor errors and misalignments of a standard IMU with three gyroscopes and three accelerometers. The original Savage sequence is well known and described. Information on an improved version of the original algorithm is available from http://www.strapdownassociates.com/Improved%20Rotation%20Test%20Part%201.pdf.

Therefore in preferred examples the first IMU is rotatably mounted to rotate about a plurality of different axes and wherein the sequence of rotations includes rotations around each of the plurality of axes. Preferably the first IMU is rotatable about three axes. Preferably the sequence of rotations is an ordered sequence that can be repeated either continuously or at regular intervals for multiple successive calibrations.

Accordingly, in preferred examples the controller is arranged to rotate the first IMU relative to the second IMU periodically. As discussed above, in the case of a sequence of manoeuvres, the sequence is repeated periodically. It may be desired to perform the manoeuvres continuously, with one sequence leading straight into the next, or the sequence may be repeated periodically but with gaps between repeats.

As discussed above, in some examples each IMU may have only a single sensor, e.g. a single accelerometer or a single gyroscope. However, IMUs frequently have a plurality of sensors and therefore preferably the first IMU has a plurality of first sensors and the second IMU has a plurality of second sensors corresponding in type to the plurality of first sensors. Both IMUs have the same set of sensors that are to be analysed so that each sensor in one IMU has a corresponding sensor in the other IMU. This does not preclude either or both IMUs from having additional sensors that are not present in the other IMU. However, in certain examples the first and second IMUs have identical sets of sensors.

In some examples each of the first IMU and the second IMU may have three linear accelerometers and three gyroscopes. The three linear accelerometers may be arranged to be mutually orthogonal to each other, or they may be arranged so as to define a three dimensional coordinate system without being orthogonal. Similarly, the three gyroscopes may be arranged to sense rotations around three mutually orthogonal axes, or around three axes that otherwise define a three dimensional coordinate system.

In some preferred examples the second IMU is fixed (relative to the vehicle/platform being navigated). In other words it is mounted in a non-rotatable fashion relative to the platform. The relative orientation between the two IMUs (and thus the IMU sensor(s)) can be changed by having only one of the IMUs rotatable. It is therefore mechanically more convenient and cost efficient to have the other IMU fixed in place. However, this is not essential and in other examples the second IMU may be rotatably mounted relative to the first IMU. In such examples both IMUs are rotatably mounted. However, the relative position and orientation of the sensors are still well defined and therefore the errors can be determined as in the case of one fixed IMU. While the rotation of one IMU could be arranged to be dependent on the other (e.g. rotating at half speed or performing manoeuvres at twice the interval), it is preferred that the two rotatable IMUs are independently rotatable so as to provide more control over the relative orientations. Such arrangements with two rotatable IMUs can increase the number of relative orientations available and also provides redundancy in case one IMU mount fails and can no longer rotate.

The sensors may be of any type used in inertial navigation systems. However, preferably the first sensor is a MEMS (Micro Electro Mechanical System) sensor. Preferably the second sensor is a MEMS sensor. MEMS sensors are small and robust and can be readily mounted rotatably without occupying a large volume. This disclosure is also particularly applicable to MEMS sensors as these can suffer from significant bias and scale factor errors which drift over time, particularly in lower cost devices. As the system of this disclosure can compensate for those errors on a continuing basis, it allows lower cost components to be used, thereby offsetting the additional cost of a second IMU. It will be appreciated that in examples where more than one sensor is present in the IMU, all the sensors may be MEMS sensors.

From the above it can be appreciated that the observations of the sensor outputs for calibration (usually by observing navigation outputs) can occur during motion and not only when the 2 IMUs are static relative to one another. This provides a great advantage of being able to calibrate and re-calibrate continually (or at least regularly, e.g. periodically) during use and while the platform is on the move, thus reducing the interval between calibrations and resulting in greater overall accuracy of the navigation system.

It can also be appreciated that the outputs of the IMUs are likely (and preferably) fed into a strapdown navigation algorithm to produce navigation outputs of attitude, heading, position, velocity, etc. By comparing these outputs (i.e. derived outputs rather than direct sensor readings) from the 2 IMU's navigation solutions, the system (e.g. a Kalman filter) can compute the true motion and errors that would have caused the observed navigation outputs. At least some of these estimates may be fed back to correct sensor errors in real time.

The errors (bias, scale factors, etc.) have time constants associated with the mechanism that causes them to change. The shortest of these is normally temperature dependence and the thermal time constant is of the order of tens of minutes. It is desirable to make the successive sensor measurements on a time scale that is relatively short compared to this time constant. Therefore in preferred examples, the successive measurements are taken at intervals of no more than 5 minutes, preferably no more than 2 minutes, more preferably no more than a minute and yet more preferably no more than 30 seconds.

This disclosure extends to an aircraft comprising an inertial navigation system as discussed above, optionally including any of the preferred or optional features. In other examples, the disclosure may be applied to other platforms such as land or water based vehicles, or subsea vehicles such as submarines.

According to another aspect, this disclosure provides a method of calibrating an inertial navigation system, wherein the inertial navigation system comprises: a first inertial measurement unit comprising at least a first sensor; and a second inertial measurement unit comprising at least a second sensor corresponding in type to the first sensor; the method comprising: acquiring a first set of measurements simultaneously from both the first inertial measurement unit and the second inertial measurement unit; rotating the first inertial measurement unit relative to the second inertial measurement unit; acquiring a second set of measurements simultaneously from both the first inertial measurement unit and the second inertial measurement unit; and calculating from the first set of measurements and the second set of measurements at least one error characteristic of the first sensor and/or the second sensor.

In preferred examples the method is carried out while the first and second IMUs are moving. For example the method may be carried out during a mission (e.g. a flight). For example the method may be carried out on a moving aircraft. Preferably the error characteristics of the sensor(s) are calculated at the same time as measurements are taken of the platform (e.g. aircraft) motion. In other words the method calculates a navigation solution, taking into account the calculated error characteristics at the same time as calculating the error characteristics. In this way the navigation solution is not based on the detectable errors of the sensors and is therefore more accurate.

All of the preferred features described above in relation to the system are equally applicable to this corresponding method.

BRIEF DESCRIPTION OF DRAWINGS

One or more non-limiting examples will now be described, by way of example only, and with reference to the accompanying figures in which.

IMUs have error sources such as the bias and scale factor of the gyroscopes and accelerometers within the IMU. These errors are typically calibrated during production or during transfer alignment (where alignment is compared to another, already aligned sensor). Thereafter, any uncorrected errors due to aging, drift, environmental factors (e.g. temperature, humidity), etc. manifest as navigation errors during use.

The value of an Inertial Navigation System, INS, increases greatly with accuracy as less reliance needs to be placed on additional aiding sensors such as satellite navigation and/or terrain based navigation. Such aiding data is not always available or cannot be used, and in such cases the INS provides the most accurate navigation information. Therefore its inherent accuracy can become very important.

In the examples of this disclosure, two IMUs are mounted such that the orientation of some or all of the sensors may be changed continuously or on a periodic basis. Then a numerical algorithm is used to estimate the most likely vehicle dynamics to have produced the measurement errors.

Figure 1A:
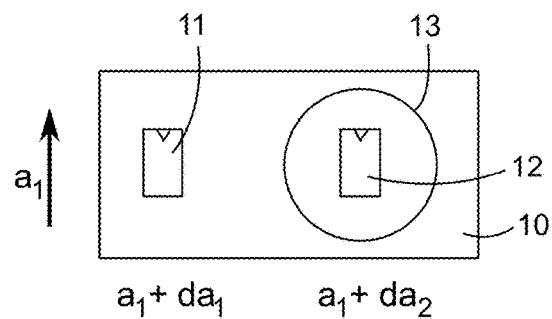
FIGS. 1a and 1b illustrate the process of sensor error calculation.
Figure 1B:
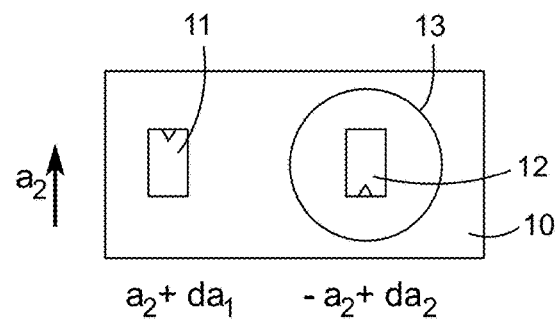

To illustrate the principles of this disclosure, consider two linear accelerometers 11, 12 mounted to a platform 10 as shown in FIG. 1*a*. The linear accelerometers 11, 12 are arranged to sense along the same axis. However one of the accelerometers 12 is rotatably mounted on a turntable 13 so that it can be periodically reversed. FIG. 1*a* shows the situation during a first measurement. The arrow to the left of FIG. 1*a* shows that the true acceleration being experienced by the platform 10 is a1. Each accelerometer 11, 12 has its own error, in this case a bias error. First accelerometer 11 has a bias error da1 and second accelerometer 12 has a bias error da2. FIG. 1*b* shows the situation during a second measurement taken shortly after the first measurement and in which the second accelerometer 12 has been rotated to point on the opposite direction to the first accelerometer 11. As shown by the arrow to the left of FIG. 1*b*, the true acceleration experienced by the platform 10 during the second measurement is a2. We can assume that if the first and second measurements are taken in relatively quick succession (e.g. every 30 seconds or every minute for example), the bias errors da1, da2 of the accelerometers 11, 12 are unchanged as they only vary slowly. However in a highly dynamic system, such as a moving vehicle, the true acceleration cannot be considered to be constant but instead must be assumed to have changed between measurements.

The first measurements from the accelerometers (FIG. 1*a*) will be:

First accelerometer 11: A1=a1+da1

Second accelerometer 12: A2=a1+da2

The second measurements from the accelerometers (FIG. 1*b*) will be:

First accelerometer 11: A1'=a2+da1

Second accelerometer 12; A2'=−a2+da2.

In this simple case there are 4 unknowns and 4 sufficiently uncorrelated measurements. Hence a solution for all four unknowns can be found:

a1=A1−(A1−A2+A1'+A2')/2 a2=A1'−(A1−A2+A1'+A2')/2.

Thus the true accelerations can be calculated with the accelerometer bias errors removed.

The bias errors can of course also be determined as:

da1=(A1−A2+A1'+A2')/2 da2=(A1'+A2'−A1+A2)/2

This illustrates how for the case of a simple IMU having only a single linear accelerometer, mounting one of the IMUs rotatably relative to the other IMU allows the sensor errors to be removed even during dynamic use, by taking measurements simultaneously from both IMUs at different times and at different relative orientations.

This approach may be generalized to make estimates of errors in more complex IMUs with multiple sensors and/or multiple types of sensors. By putting at least one of the IMUs through a sequence of movements, the different sensors in one IMU can be placed at different orientations relative to the corresponding sensors in the other IMU. Measurements can be taken in each of those different relative orientations and these measurements can then be combined to cancel out the sensor errors.

As an example, movements similar to those of the Savage sequence may be used to move one of the IMUs through a set of manoeuvres that efficiently covers all relative orientations required to determine and thus cancel out the sensor errors of a full three dimensional IMU with three orthogonal linear accelerometers and three orthogonal gyroscopes.

To extend this process for estimating scale factor error, one strategy is to imagine a motion that will cause a scale factor error to excite an observable navigation error. There are many of these. One example is provided here for accelerometers and one example for gyroscopes. For simplicity of understanding, these examples are valid for stationary measurements but can be extrapolated using the twin IMU concept described above to work in motion:

For accelerometers: Point the accelerometer of interest in the IMU horizontally (North say) and observe the Northerly acceleration reported by the Strapdown Navigation algorithms (A1). This will be the sum of the accelerometer bias B and the tilt error of the navigation algorithm T. Then rotate the IMU about the vertical axis until the accelerometer of interest faces South and again observe the Northerly acceleration reported by the Strapdown Navigation algorithms (A2). This will be T minus B. Now the bias B may be calculated as (A1−A2)/2. To calculate the accelerometer error one may point the accelerometer up observing acceleration U then down observing acceleration D. If the scale factor error is S then it will have measured U=(1+S)g and D=(−1−S)g, where 'g' is the acceleration due to gravity. S may be calculated as (U−D−2g)/2g. Note that in these calculations the bias error has already been removed as it can be determined as above.

For a gyroscope: With the gyroscope of interest having its sensing axis in the horizontal plane, observe the acceleration along an axis also in the horizontal plane but orthogonal to the gyroscope's sensing axis. Now rotate the system through 360 degrees about the gyroscope's sensing axis and the 'tilt error' of the navigation system will change by 360 degrees multiplied by the scale factor error. This causes a change to the reported acceleration because the assumed direction of the gravity vector will change by this amount. Hence the change in reported acceleration along the axis described earlier is proportional to the gyroscope scale factor error. If the change in acceleration calculated by the navigation algorithm from before to after the rotation is dA then the gyro scale factor may be calculated as (dA/g)/(2*pi).

As indicated above, these procedures can be extended to the twin (or multiple) IMU arrangement of this disclosure such that the calibrations can be performed in a dynamic movement situation (e.g. in flight) while accelerations and rotations being experienced dynamically. While an algebraic solution should be possible, in practice this may be very hard to do, especially in the usual case where multiple sensors (e.g. three accelerometers and three gyroscopes) are being used. Therefore in practical implementations it may be preferred to find a solution by other methods, e.g. iterative methods that converge upon an approximate solution.

It may be noted that if the system of this disclosure is built with two IMUs then their relative angular motion need not be accurately controlled during the manoeuvres because, as with the Savage sequence, the IMUs will provide their own motion data with errors that are themselves being modelled. For example the manoeuvres typically include rotations by multiples of 90 degrees about different axes. However, it is not necessary to precisely control the amount of rotation as the gyroscopes can measure the amount of rotation. Any sensor errors in those measurements are built into the calculations and solved as part of the process so that they can be removed from the final navigation solution.

The numerical algorithm used to calculate the overall navigation solution and the individual sensor errors may be a Kalman filter. The Kalman filter receives observations from the two IMUs after each manoeuvre in the sequence. The Kalman filter also contains a model of the system such that it knows the relative orientations of the two IMUs at any given measurement time and can therefore update its estimates of the current state, including estimates of the sensor errors and estimates of the true dynamics (accelerations/rotation rates of the platform). Over time, the Kalman filter thus effectively solves the set of simultaneous equations arising from the sequence of manoeuvres, updating the navigation solution each time a measurement is taken (i.e. between each manoeuvre of the sequence. Thus the Kalman filter can use knowledge of the arbitrary trajectory taken by the platform (e.g. aircraft or other vehicle) and knowledge of the motions that are designed to excite the errors to process the observations and continually update estimates of each sensor error.

In some examples, the observations made by the Kalman filter can be the two IMUs' relative position (taking into account lever arm effects between the IMUs and between sensors in the IMUs) and their relative velocities because the two IMUs are fixed to the same platform (e.g. vehicle) at a known distance apart (known relative position).

Figure 2:
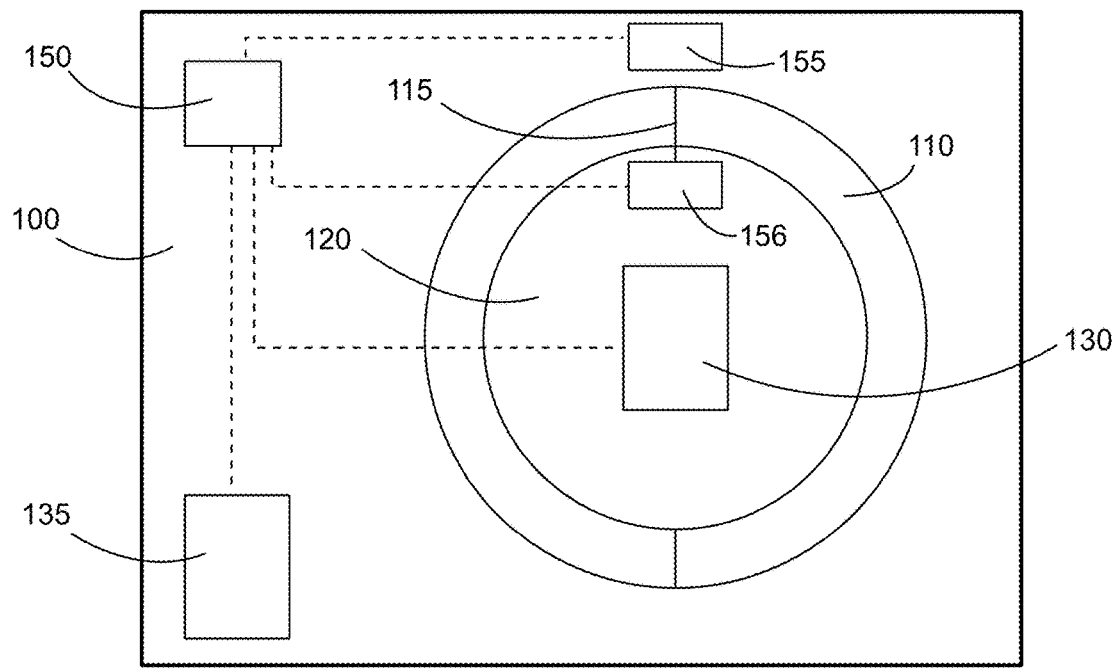
FIG. 2 shows a platform with two IMUs mounted thereon.

FIG. 2 shows a platform 100 on which a first IMU 130 is rotatably mounted and a second IMU 135 is fixed. The first IMU 130 is mounted on an inner table 120 that is rotatable about an axis 115. The inner table 120 is itself rotatably mounted (for rotation about axis 115) to an outer table 110. The outer table 110 is rotatably mounted to platform 100 for rotation about an axis perpendicular to the page. With this arrangement, first IMU 130 can be rotated to any desired orientation relative to second, fixed, IMU 135.

A controller 150 is arranged to receive measurement data from each of the first IMU 130 and the second IMU 135 and is also arranged to control motor units 155 and 156 which rotate the inner table 120 and outer table 110 respectively. Controller 150 may be programmed with a suitable sequence of manoeuvres through which to rotate first IMU 130 as described above and may also contain the numerical algorithm which combines the sensor data from IMUs 130, 135 to remove sensor errors.

Figure 3:
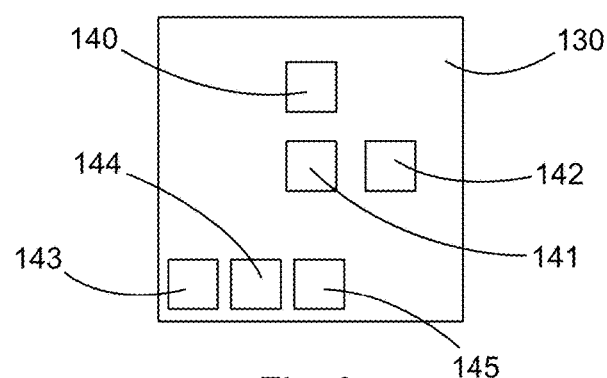
FIG. 3 shows the sensors in an IMU.

FIG. 3 shows an example of an IMU 130 (or equivalently 135) comprising a full set of gyroscopes and linear accelerometers for three dimensional positioning. First gyroscope 140 is arranged to sense rotation about a vertical axis in the page, second gyroscope 141 is arranged to sense rotation about an axis perpendicular to the page and third gyroscope 142 is arranged to sense rotation about a horizontal axis in the page. First accelerometer 143, second accelerometer 144 and third accelerometer 145 are arranged to sense accelerations along those three axes.

In the preferred implementation described and shown here, one of the IMUs, 135 is fixed relative to the vehicle frame (platform 100). However in other examples both IMUs 130, 135 could be rotatably mounted in the same fashion.

This disclosure thus provides an Inertial Navigation System with a pair of IMUs in a special configuration such that the overall quality of navigation is significantly better than would be expected from each IMU individually. When used with the highest quality IMUs available, this can be used to provide a more accurate navigation solution than has been possible previously, or when used with lower cost, lower accuracy IMUs, an accurate, yet inexpensive INS can be provided.

The invention claimed is:

1. An inertial navigation system comprising:
a first inertial measurement unit comprising at least a first sensor; and
a second inertial measurement unit comprising at least a second sensor corresponding in type to the first sensor;
wherein the first inertial measurement unit is rotatably mounted to rotate about a plurality of different axes relative to the second inertial measurement unit; and
wherein the inertial navigation system further comprises a controller arranged to:
acquire a first set of measurements simultaneously from both the first inertial measurement unit and the second inertial measurement unit;
rotate the first inertial measurement unit relative to the second inertial measurement unit;
acquire a second set of measurements simultaneously from both the first inertial measurement unit and the second inertial measurement unit; and
calculate from the first set of measurements and the second set of measurements at least one error characteristic of the first sensor and/or the second sensor;
wherein the at least one error characteristic comprises the sensor scale factor of at least the first sensor and/or the second sensor.

2. An inertial navigation system as claimed in claim 1, wherein the first inertial measurement unit is rotatably mounted to rotate around at least two different axes.

3. An inertial navigation system as claimed in claim 1, wherein the controller is arranged to calculate the sensor bias of at least the first sensor and/or the second sensor.

4. An inertial navigation system as claimed in claim 1, wherein the controller is arranged to rotate the first inertial measurement unit relative to the second inertial measurement unit through a sequence of manoeuvres.

5. An inertial navigation system as claimed in claim 4, wherein the sequence of rotations includes rotations around each of the plurality of axes.

6. An inertial navigation system as claimed in claim 1, wherein the controller is arranged to rotate the first inertial measurement unit relative to the second inertial measurement unit periodically.

7. An inertial navigation system as claimed in claim 1, wherein the first inertial measurement unit has a plurality of first sensors and wherein the second inertial measurement unit has a plurality of second sensors corresponding in type to the plurality of first sensors.

8. An inertial navigation system as claimed in claim 7, wherein each of the first inertial measurement unit and the second inertial measurement unit has three linear accelerometers and three gyroscopes.

9. An inertial navigation system as claimed in claim 1, wherein the second inertial measurement unit is fixed.

10. An inertial navigation system as claimed in claim 1, wherein the second inertial measurement unit is rotatably mounted relative to the first inertial measurement unit.

11. An aircraft comprising:
an inertial navigation system as claimed in claim 1.

12. A method of calibrating an inertial navigation system, wherein the inertial navigation system comprises:
a first inertial measurement unit comprising at least a first sensor; and
a second inertial measurement unit comprising at least a second sensor corresponding in A method of calibrating an inertial navigation system, wherein the inertial navigation system comprises:
a first inertial measurement unit comprising at least a first sensor; and
   a second inertial measurement unit comprising at least a second sensor corresponding in type to the first sensor;
the method comprising:
   acquiring a first set of measurements simultaneously from both the first inertial measurement unit and the second inertial measurement unit;
rotating the first inertial measurement unit about a plurality of different axes relative to the second inertial measurement unit;
acquiring a second set of measurements simultaneously from both the first inertial measurement unit and the second inertial measurement unit; and
calculating from the first set of measurements and the second set of measurements at least one error characteristic of the first sensor and/or the second sensor;
wherein the at least one error characteristic comprises the sensor scale factor of at least the first sensor and/or the second sensor.

13. A method as claimed in claim 12, wherein the method is carried out while the first and second inertial measurement units are moving.

14. A method as claimed in claim 13, wherein the method is carried out on a moving aircraft.

* * * * *